US005764211A

United States Patent [19]

Tagawa et al.

[11] Patent Number: 5,764,211

[45] Date of Patent: Jun. 9, 1998

[54] APPARATUS AND METHOD FOR APPLYING PRE-PULSES TO ROW SELECTION ELECTRODES IN A LIQUID CRYSTAL DEVICE TO PREVENT PATTERNING DEPENDENCE OF SWITCHING BEHAVIOUR

[75] Inventors: Akira Tagawa; Paul Bonnett; Michael John Towler, all of Oxford, United Kingdom

[73] Assignee: Sharp Kabushiki Kaisha, Osaka, Japan

[21] Appl. No.: 537,511

[22] Filed: Oct. 2, 1995

[30] Foreign Application Priority Data

Oct. 3, 1994 [GB] United Kingdom .................. 9419898

[51] Int. Cl.$^6$ .................................................. G02F 1/13

[52] U.S. Cl. .................................................. 345/97

[58] Field of Search .............................. 345/94, 58, 97; 359/56; 349/1, 184

[56] References Cited

U.S. PATENT DOCUMENTS

| | | |
|---|---|---|
| 4,679,043 | 7/1987 | Morokawa . |
| 4,693,563 | 9/1987 | Harada et al. . |
| 4,746,196 | 5/1988 | Umeda et al. . |
| 4,917,469 | 4/1990 | Ross . |
| 5,233,459 | 8/1993 | Bozler et al. . |
| 5,289,175 | 2/1994 | Kawagichi et al. . |
| 5,500,749 | 3/1996 | Inaba et al. . |
| 5,532,713 | 7/1996 | Okada et al. . |

FOREIGN PATENT DOCUMENTS

| | | |
|---|---|---|
| 0214856 | 3/1987 | European Pat. Off. . |
| 0319291 | 6/1989 | European Pat. Off. . |
| 0373786 | 6/1990 | European Pat. Off. . |
| 63-197920 | 8/1988 | Japan . |
| 2262612 | 10/1990 | Japan . |
| 2262614 | 10/1990 | Japan . |
| 2173336 | 10/1986 | United Kingdom . |
| 2249653 | 5/1992 | United Kingdom . |
| 8901680 | 2/1989 | WIPO . |
| 8901681 | 2/1989 | WIPO . |

OTHER PUBLICATIONS

Search Report for U.K. Appl. 9419898.3, mailed Jan. 5, 1995.

Upoh et al, Ferroelectrics, vol. 132, pp. 293–307, 1992, "Addressing Schemes for Ferroelectric Liquid Crystal Matrix Displays".

Search Report for European Appl. 95306981.2-2213, mailed Feb. 9, 1996.

*Primary Examiner*—Mark R. Powell

[57] ABSTRACT

A ferroelectric liquid crystal display includes data electrodes connected to a data signal generator and strobe electrodes connected to a strobe signal generator. The strobe signal generator supplies strobe signals in sequence to the strobe electrodes within a plurality of consecutive time slots and the data signal generator supplies data signals simultaneously and in synchronism with the strobe signals so as to refresh sequentially the rows of pixels formed at the intersections of the data electrodes and the strobe electrodes, each pixel having at least two switching thresholds. Each of the strobe signals comprises a strobe pulse within a corresponding one of the time slots, the strobe pulse being preceded by a pre-pulse which reduces the effects of pixel patterning caused by refreshing the previously refreshed row of pixels. The pre-pulse extends within a time slot preceding the corresponding one of the plurality of consecutive time slots. The duration of the pre-pulse is greater than the duration of one of the plurality of consecutive time slots.

15 Claims, 9 Drawing Sheets

FB029

APPARATUS AND METHOD FOR APPLYING PRE-PULSES TO ROW SELECTION ELECTRODES IN A LIQUID CRYSTAL DEVICE TO PREVENT PATTERNING DEPENDENCE OF SWITCHING BEHAVIOUR

The present invention relates to a liquid crystal display, a strobe signal generator, and a method of addressing a liquid crystal display.

TECHNICAL FIELD OF THE INVENTION

Ferro-electric liquid crystal displays (FLCDs) are prime contenders for use in high resolution display applications including high definition television (HDTV) panels. However, such applications require that the display be capable of producing a large number of grey levels, for instance 256 grey levels for HDTV. Although digital methods are known for producing grey levels in FLCDs, involving spatial and temporal multiplexing or "dither" techniques, it has not been possible to achieve more than 64 grey levels in practical panels.

DESCRIPTION OF THE RELATED ART

It is possible to produce grey levels using analogue methods. For instance, by providing four grey levels by analogue methods in combination With two "bits" of spatial dither and two bits of temporal dither, 256 grey levels can be produced in practical FLCDs. However, in order to achieve four analogue grey levers, it is necessary to produce FLCDs having two or more different switching threshold levels within each pixel (picture element). The problem is then to "address" the different analogue grey levels.

Displays of this type comprise row and column electrodes extending on opposite sides of the liquid crystal. The intersections of these electrodes define liquid crystal pixels. Strobe signals are applied sequentially to, for instance, the row electrodes whereas data signals are applied simultaneously to the column electrodes and in synchronism with the strobe signals. Thus, the data to be displayed are written into the display a row at a time. In the case of pixels providing four analogue grey levels, ferro-electric liquid crystals may be used having a minimum in the τ-V curve. Techniques exist for providing different regions within each pixel with a different τ-V minimum and these regions can be controlled independently by applying suitable data and strobe signals. In practice, the strobe signals are the same for all rows and all grey levels whereas the data signals vary in order to address the different regions of each pixel. Thus, four different types of data signals are required.

Data written into each row of the display affects the pixels in the succeeding row. This effect is known as "patterning" and causes problems in addressing the correct grey levels. Similar problems can occur in displays required to produce only two grey levels i.e. black and white.

Patterning causes an increase in the width between 0% switching and 100% switching of τ-V curves. Consequently, the driving margin for driving grey levels is diminished and the required difference in threshold levels for the regions of each pixel is larger: An addressing technique known as the JOERS/Alvey scheme is suitable for black and white operation and has a relatively large driving margin so that the effects of pixel patterning are relatively small. Another technique known as the Malvern type provides faster switching but reduces the driving margin. The effect of pixel patterning may therefore be more serious because the width of the switching curve is effectively increased and this makes the driving margin even narrower. Other driving schemes having narrower driving margins than the JOERS/Alvey scheme will also suffer more from the same problem. Driving schemes for achieving grey levels have fundamentally narrower driving margins compared with those for black and white operation so that the effect of pixel patterning is a serious problem.

A known technique for addressing a black and white display divides each frame of data to be displayed into a first sub-frame comprising black data and a second sub-frame comprising white data. The sub-frames are supplied sequentially to the display to ensure that all of the pixels are switched to the correct state for displaying the data frame. However, this technique effectively halves the display rate of the display because two complete display refresh cycles are required to display each frame of data.

Another known technique for avoiding this problem is disclosed in GB 2 173 336 and GB 2 249 653 and uses strobe signals which provide a blanking pulse ahead of each strobe pulse. For each row of the display, the blanking pulse resets all of the pixels to their black state and the strobe pulse switches those pixels which are required to be in their white state. However, the blanking pulses are required to be of a level and duration sufficient to switch the pixels from the white state to the black state independently of pixel pattern.

SUMMARY OF THE INVENTION

According to a first aspect of the invention, there is provided a liquid crystal display as defined in the appended claim 1.

According to a second aspect of the invention, there is provided a strobe signal generator as defined in the appended claim 11.

According to a third aspect of the invention there is provided a method as defined in the appended claim 14.

Preferred embodiments of the invention are defined in the other appended claims.

It is thus possible to provide a technique which effectively overcomes the problem of patterning within a liquid crystal display. The technique is particularly useful for displays having grey level capability and reduces or overcomes the problem of patterning.

BRIEF DESCRIPTION OF THE DRAWINGS

The invention will be further described, by way of example, with reference to the accompanying drawings, in which.

DETAILED DESCRIPTION OF THE PREFERRED EMBODIMENTS

Figure 1:
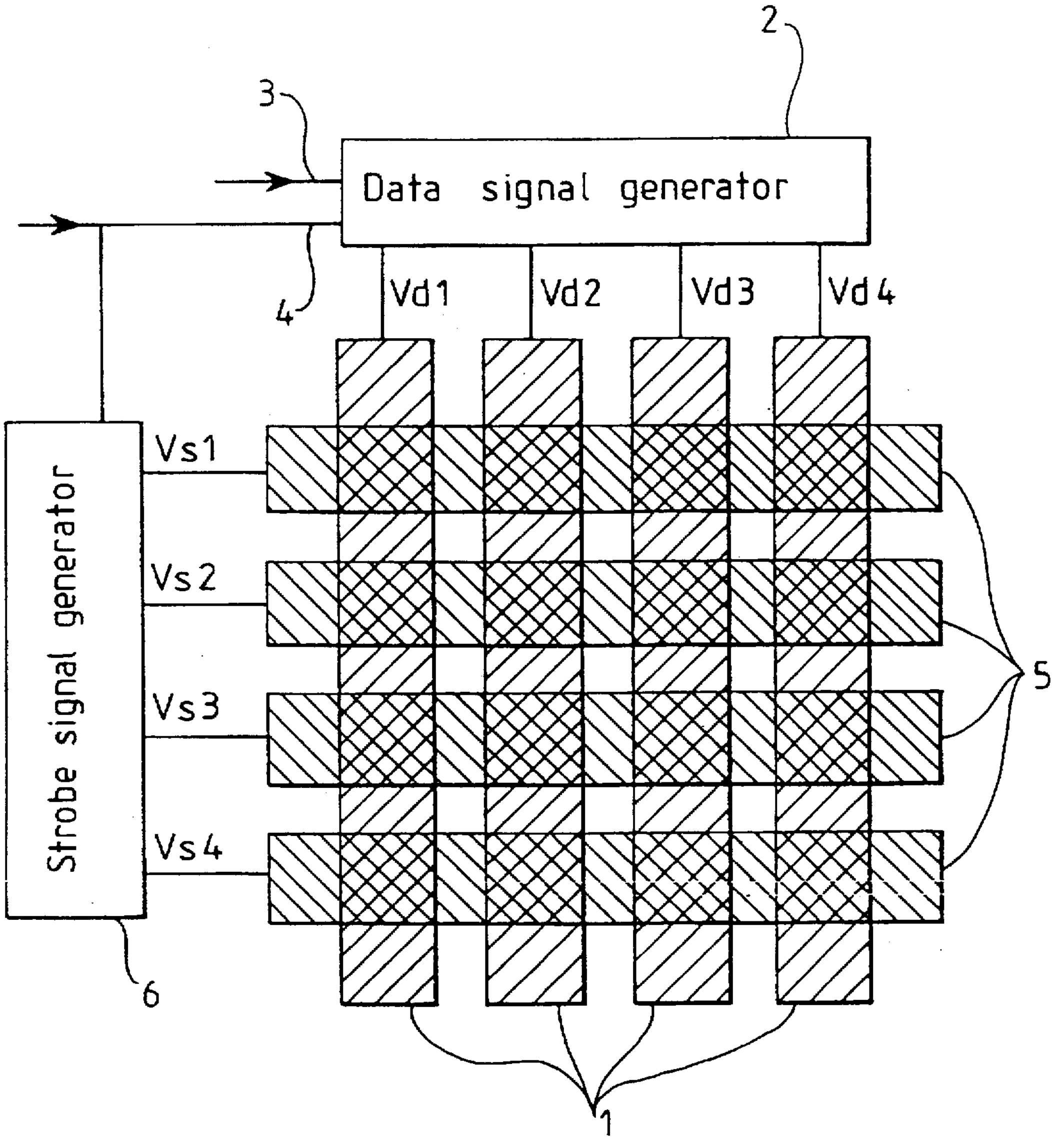
FIG. 1 is a schematic diagram of a liquid crystal display to which the invention may be applied.

FIG. 1 shows a liquid crystal display comprising a 4×4 array of pixels. In practice, a display would comprise many more pixels arranged as a square or rectangular matrix but a 4×4 array has been shown for the sake of simplicity of description.

The display comprises four column electrodes 1 connected to respective outputs of a data signal generator 2 so as to receive data signals Vd1 to Vd4. The generator 2 has a data input 3 for receiving data to be displayed, for instance one row at a time. The generator 2 has a synchronising input 4 for receiving timing signals so as to control the timing of the supply of the data signals Vd1 to Vd4 to the column or data electrodes 1.

The display further comprises four row electrodes 5 connected to respective outputs of a strobe signal generator 6 so as to receive respective strobe signals Vs1 to Vs4. The generator 6 has a synchronising input which is also connected to receive timing signals for controlling the timing of supply of the strobe signals to the row or strobe electrodes 5.

Figure 12:
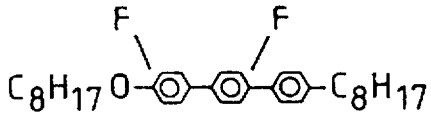
FIG. 12 illustrates the structure of a liquid crystal suitable for use in a display.

The display further comprises a liquid crystal arranged as a layer between the data electrodes 1 and the strobe electrodes 5. The liquid crystal comprises a ferroelectric liquid crystal of smectic type which is essentially bistable. The liquid crystal is of the type having a minimum in its τ-V characteristic. A suitable material comprises 70% SCE8+ 20% SCE8(R)+10%FB029. The structure of FB029 is shown in FIG. 12. In one example, the thickness of the liquid crystal layer is 1.67 micrometers with parallel rubbed alignment layers providing approximately 5° of surface tilt.

The intersections between the data and strobe electrodes define individual pixels which are addressable independently of each other. Further, each pixel is arranged to have regions of different τ-V minima so that these regions can be independently addressed to provide different grey levels. Techniques exist for achieving this and any suitable technique may be adopted.

Figure 2:
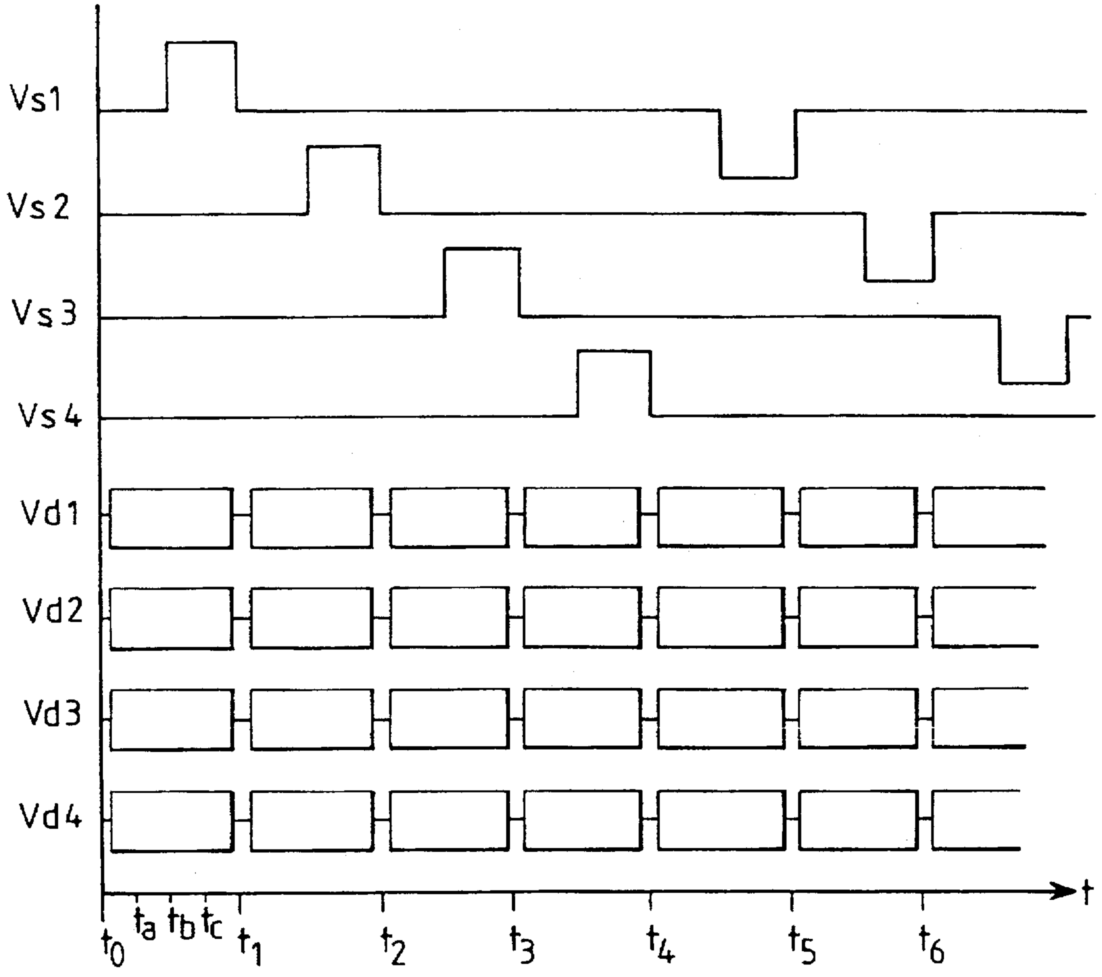
FIG. 2 PRIOR ART
FIG. 2 is a timing diagram illustrating strobe and data signals for a display of the type shown in FIG. 1 using a conventional addressing technique.

FIG. 2 is a diagram illustrating the timing and waveforms of the data and strobe signals in accordance with an existing technique of operating a display of the type shown in FIG. 1. The strobe signals Vs1 to Vs4 are supplied in sequence to the row electrodes 5 with each strobe signal occupying a respective time slot. Thus, the-strobe signal Vs1 is supplied during the time slot $t_0$ to $t_1$, the strobe Vs2 is supplied during the time slot $t_1$ to $t_2$, and so on with the sequence repeating for consecutive groups of four time slots. Further, each time slot is divided into four sub-slots, for instance as illustrated for the first slot with the sub-slots starting at $t_0$, $t_a$, $t_b$, and $t_c$. During its active time slot, for instance the first time slot for the strobe signal Vs1, the strobe signal has zero level for the first two sub-slots and a predetermined level Vs for the third and fourth time sub-slots. In order to prevent DC imbalance, the polarities of the strobe signals may be reversed after each complete frame refresh of the display.

The data signals Vd1 to Vd4 are supplied simultaneously with each other and in synchronism with the strobe signals, as shown in FIG. 2. For the purpose of illustration, each data signal is illustrated by a rectangular box in FIGS. 2, 5 and 6. However, the data signals are contiguous and are not separated by gaps.

Figure 3:
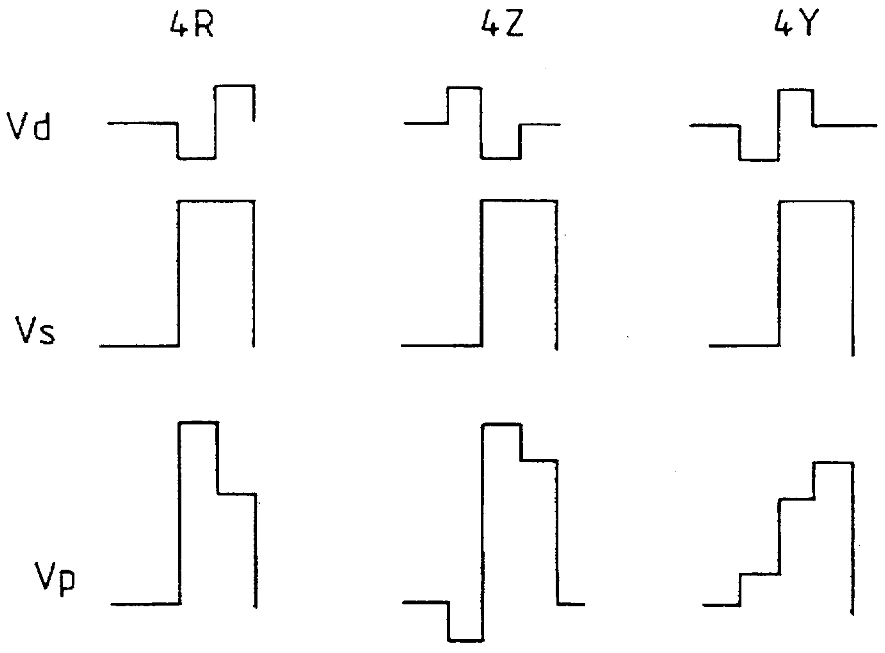
FIGS. 3 and 4 illustrate the waveforms of two sets of data signals for providing analogue grey level addressing.

The data signals have different waveforms corresponding to the regions of the pixel to be switched. One example of suitable waveforms is shown in FIG. 3. In particular, three different waveforms for forming a data pulse are shown at Vd, each of which may be provided in the data signal in accordance with the desired grey level to be switched. The data pulse waveforms have no net DC component and are zero for two sub-slots and plus and minus Vd for the other two sub-slots of each time slot. FIG. 3 shows the strobe waveform Vs below each of the data pulse waveforms and the resulting effective waveform applied across the pixel is illustrated at Vp. Thus, the three waveforms Vp can be selectively applied across the pixels in accordance with the selected data pulse waveforms so as to control the switching of grey level in the pixel.

Figure 4:
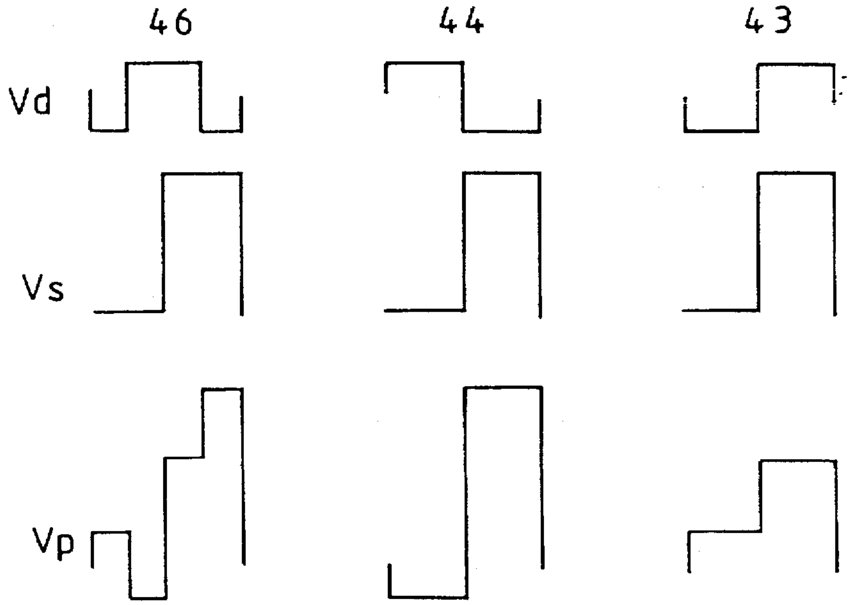
Figure 7:
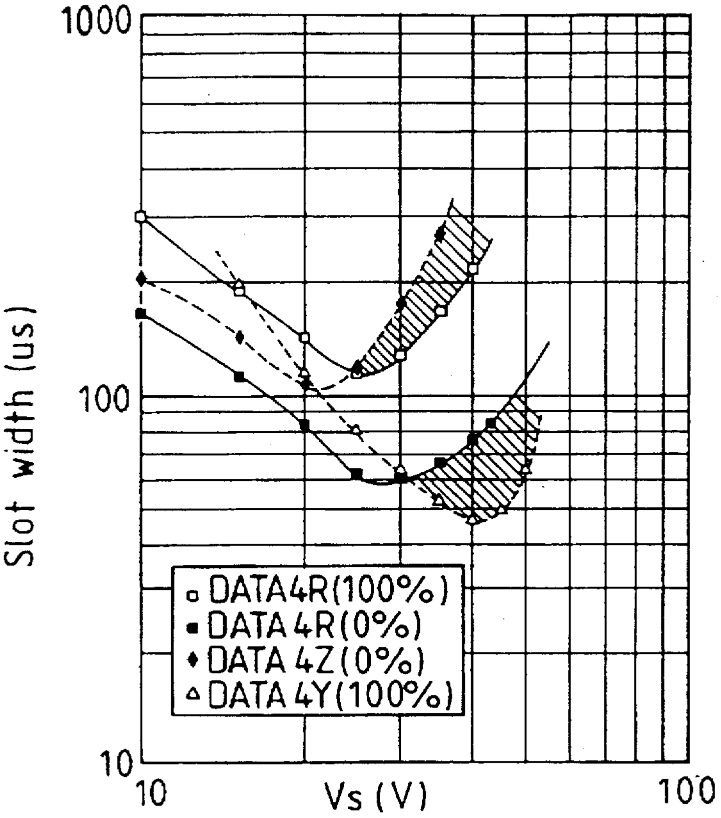
FIGS. 7 to 11 are graphs showing the τ-V characteristics achievable by using different combinations of the data and strobe signals and data pulse waveforms illustrated in FIGS. 2 to 6.

FIG. 4 illustrates the data pulse waveforms for another grey level addressing technique. The strobe pulse waveforms are the same as in FIG. 3 but the data pulses Vd and consequently the resulting pixel waveforms Vp are different. In this case, each data pulse Vd has a level +Vd for two sub-slots and a level −Vd for the remaining two sub-slots of each time slot. Again, each data pulse has no net DC component. FIG. 7 shows the τ-V or switching curves for a pixel using the addressing scheme illustrated in FIG. 2 and the data pulses illustrated in FIG. 3. In particular, FIG. 7 shows the effect on each row of pixels caused by the refreshing of the preceding row of pixels. The horizontal axis represents the effective voltage Vs of the strobe pulse whereas the vertical axis represents the effective time width of the strobe pulses as modified by the data pulses.

The shaded areas between the curves in FIG. 7 are usable for achieving three grey levels with two different threshold voltages. In order to achieve four grey levels, one further intermediate τ-V curve is required.

The effect of pixel patterning from the previously refreshed row of pixels is such that the width of the intermediate switching curve (corresponding to DATA 4R) is relatively large and of the order of 20 volts. This means that different threshold levels of at least 20 volts are required.

Figure 8:
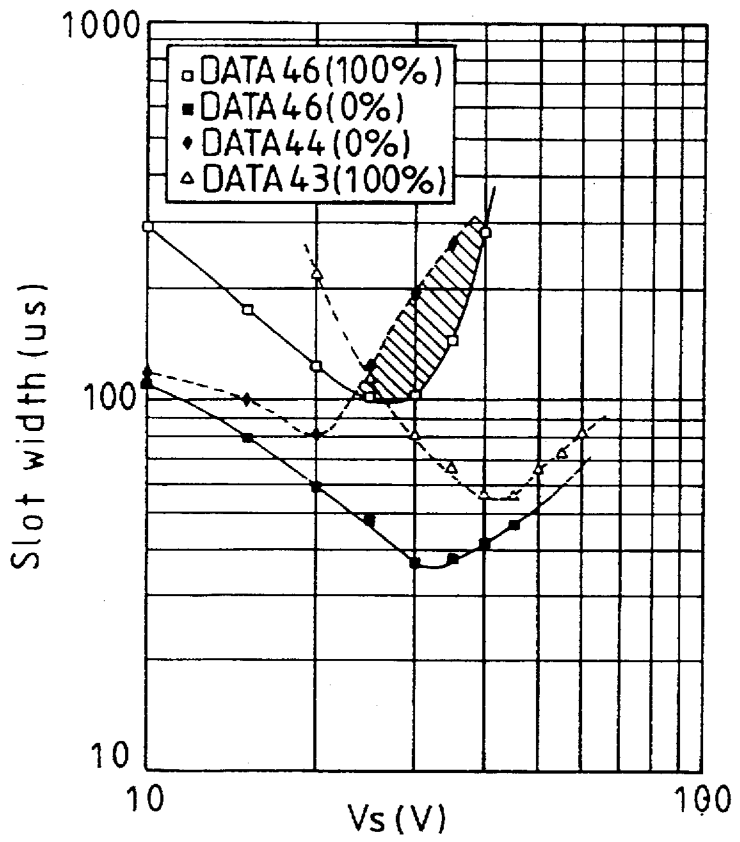

FIG. 8 illustrates the τ-V characteristics for a display using the known addressing technique shown in FIG. 2 together with the data pulse waveforms shown in FIG. 4. Again, pixel patterning causes the width of the intermediate switching curve to be relatively large.

Figure 5:
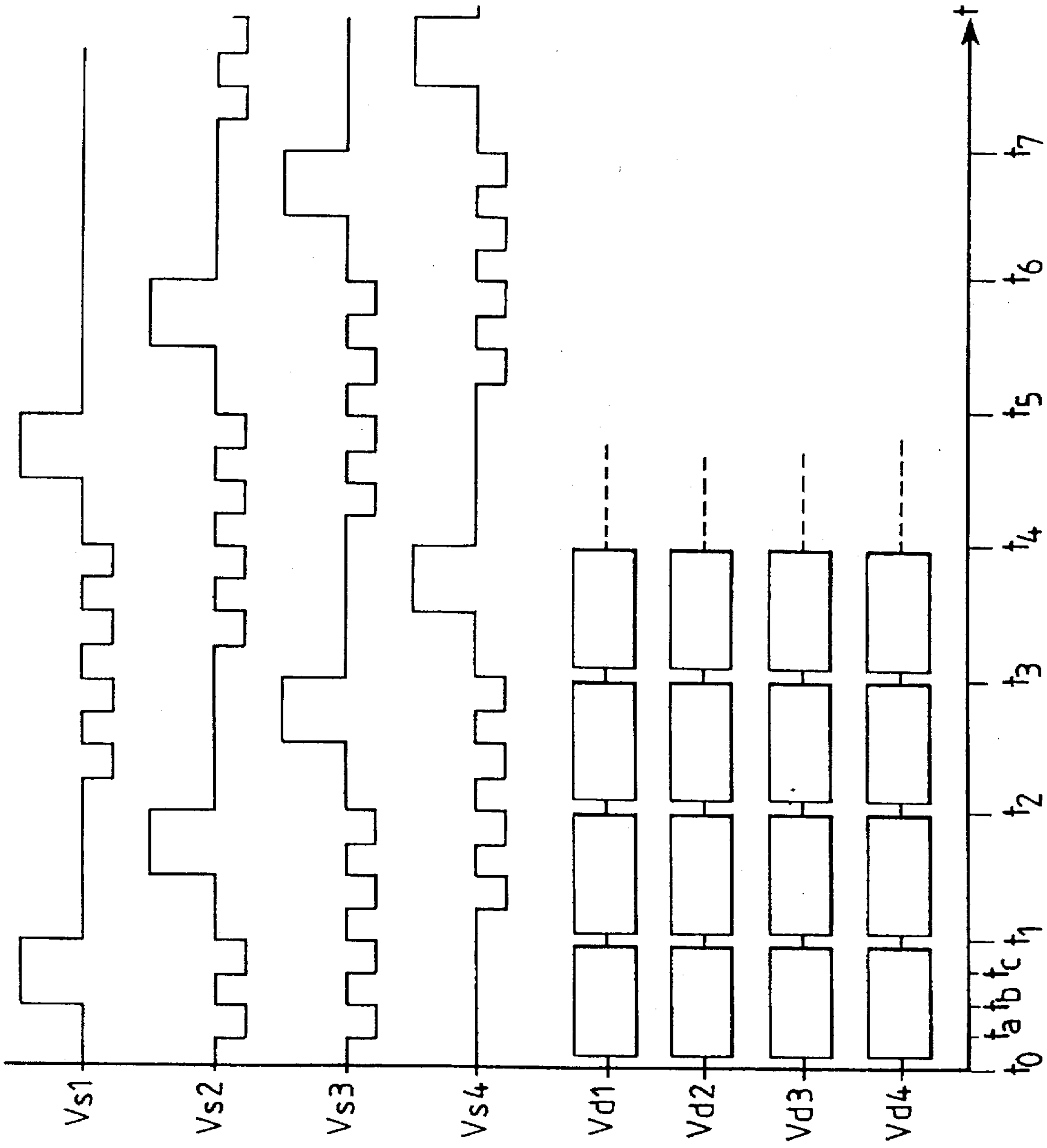
FIGS. 5 and 6 are timing diagrams illustrating strobe and data signals for displays of the type shown in FIG. 1 and embodying the present invention.

FIG. 5 illustrates an addressing scheme according to the present invention in which each strobe pulse Vs1 to Vs4 is preceded by a pre-pulse. Each pre-pulse is divided into four sub-pulses, each having a level of −Vs/2 and a duration of one sub-slot, the four sub-pulses being spaced from each other by one sub-slot and finishing at the start of the time slot in which the strobe pulse occurs. The strobe signals thus have no net DC component and need not be alternately reversed in polarity in order to provide DC compensation.

Figure 9:
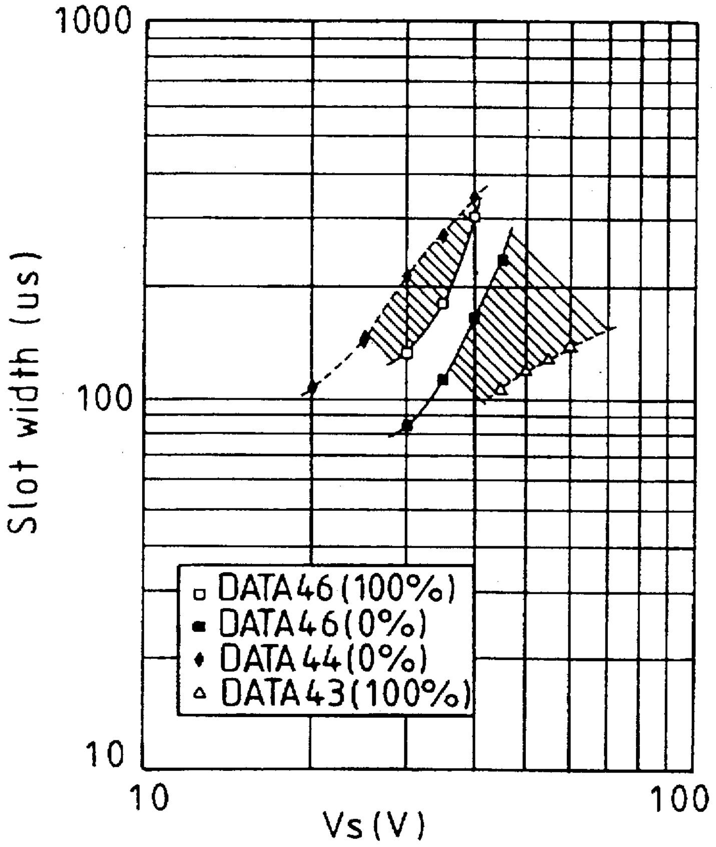

FIG. 9 shows the τ-V characteristics for a pixel using the strobe signals illustrated in FIG. 5 and the data signal waveforms illustrated in FIG. 4. Compared with the known techniques, the presence of the pre-pulses in the strobe signals reduces the effect of pixel patterning such that the width of the intermediate curve is decreased and the differences between the threshold levels are smaller.

Figure 6:
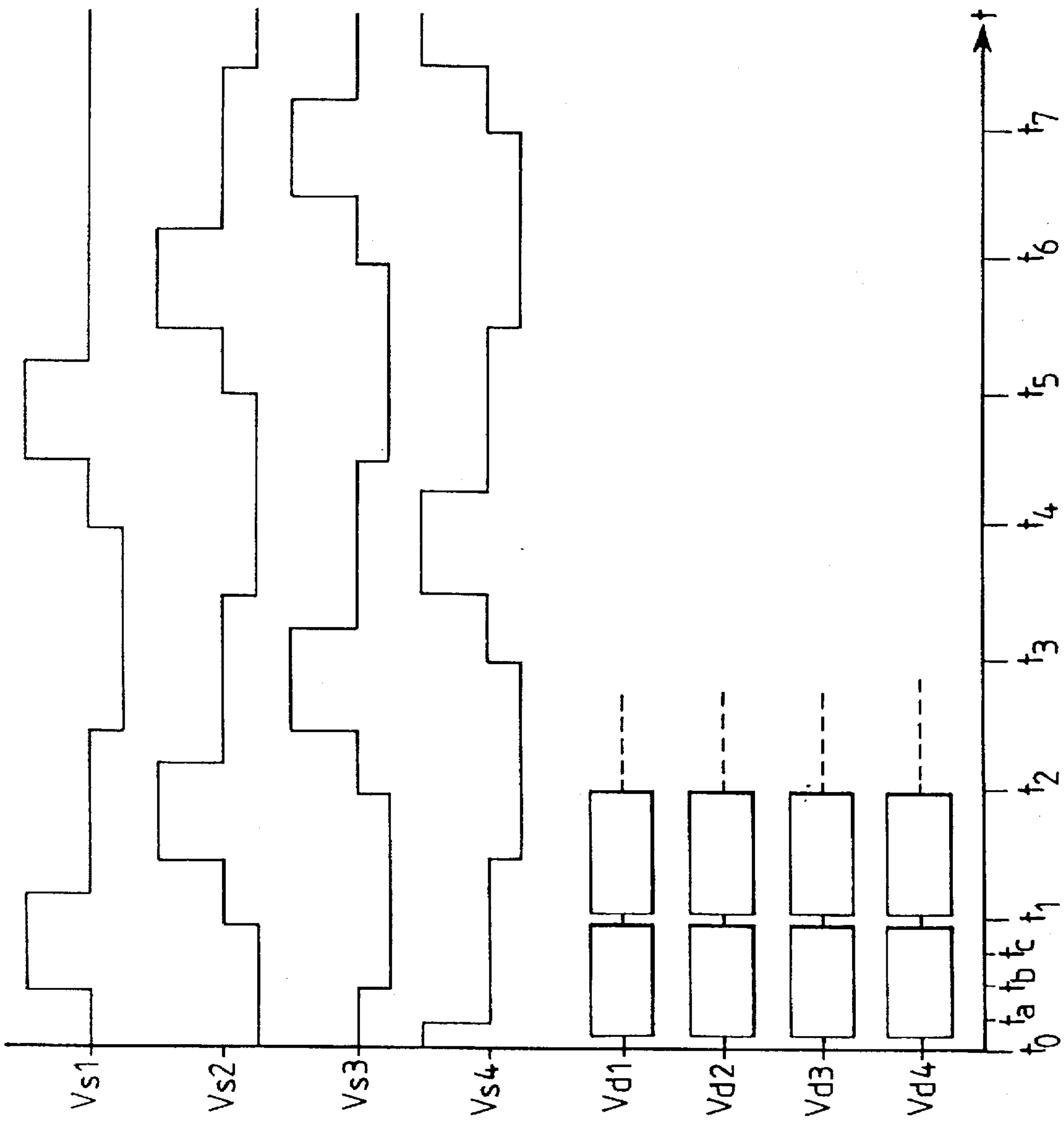
Figure 10:
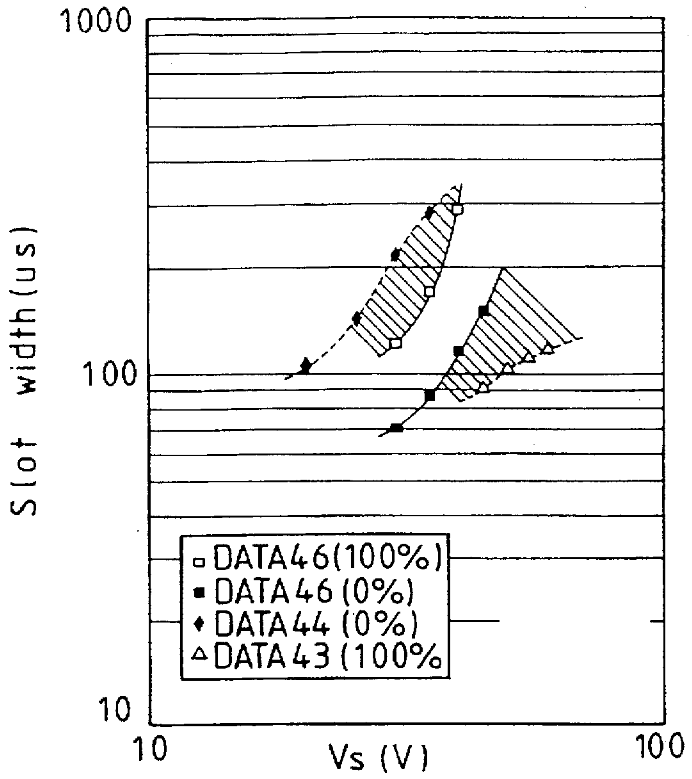

FIG. 10 shows the effect of separating the pre-pulses and strobe pulses shown in FIG. 5 by one time slot. FIG. 6 illustrates the use of extended strobe pulses which extend into the first sub-slot of each subsequent timing slot. Further, the pre-pulses have the same amplitude as in FIG. 5 but begin one sub-slot later.

Figure 11:
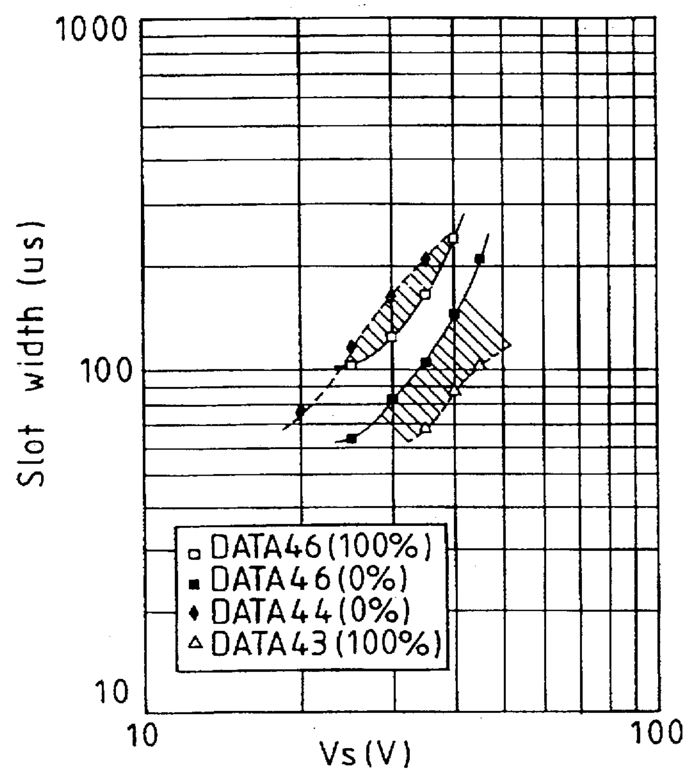

FIG. 11 illustrates the τ-V characteristics of a pixel using the strobe signals shown in FIG. 6 together with data pulse waveforms of the type shown in FIG. 4. The pre-pulses reduce the effects of pixel patterning so that the width of the intermediate curve is decreased and the required differences in threshold levels are reduced compared with known addressing techniques.

By applying a pre-pulse, which may comprise more than one sub-pulse, before each strobe pulse, the effects of pixel patterning can be substantially reduced or eliminated. Thus, problems in addressing different grey levels within each pixel can be reduced or avoided. Consequently, it is possible to provide liquid crystal display panels suitable for high resolution applications, such as HDTV, operating at relatively high refresh rates, such as video rate.

What is claimed is:

1. A liquid crystal display comprising: a plurality of data electrodes; a plurality of strobe electrodes; a plurality of liquid crystal pixels formed at intersections between the data electrodes and the strobe electrodes, each liquid crystal pixel having bistable liquid crystal and at least two switching thresholds; and a strobe signal generator arranged to supply strobe signals sequentially to the strobe electrodes within a plurality of consecutive time slots, each strobe signal comprising a strobe pulse within a corresponding one of the plurality of consecutive time slots, the strobe pulse being preceded by a pre-pulse for reducing patterning caused during a preceding strobe signal, the pre-pulse extending within a time slot preceding the corresponding one of the plurality of consecutive time slots and having a duration greater than the duration of one of the plurality of consecutive time slots.

2. A display as claimed in claim 1, in which the liquid crystal is a smectic liquid crystal.

3. A display as claimed in claim 1, in which the liquid crystal has a minimum in its response time-voltage($\tau$-V) characteristic.

4. A display as claimed in claim 1, in which the liquid crystal is a ferroelectric liquid crystal.

5. A display as claimed in claim 4, in which the strobe signal generator is arranged to generate the pre-pulses preceding the corresponding strobe pulses so as to switch the ferroelectric liquid crystal molecules into one of their stable states.

6. A display as claimed in claim 1, in which each pre-pulse has a polarity which is opposite that of the succeeding strobe pulse.

7. A display as claimed in claim 6, in which each strobe signal has no net direct current component.

8. A display as claimed in claim 1, further comprising a data pulse generator for supplying simultaneously to the data electrodes a plurality of data signals in synchronism with the supply of the strobe pulses by the strobe pulse generator.

9. A display as claimed in claim 8, in which each of the data signals has no net direct current component.

10. A strobe signal generator for strobing a liquid crystal display of the type comprising: a plurality of data electrodes; a plurality of strobe electrodes; and a plurality of liquid crystal pixels formed at intersections between the data electrodes and the strobe electrodes, each liquid crystal pixel having bistable liquid crystal and at least two switching thresholds, the strobe signal generator being arranged to produce sequential strobe signals within a plurality of consecutive time slots, each of the strobe signals comprising a strobe pulse within a corresponding one of the plurality of consecutive time slots, the strobe pulse being preceded by a pre-pulse for reducing patterning caused during a preceding strobe signal, the pre-pulse extending within a time slot preceding the corresponding one of the plurality of consecutive time slots and having a duration greater than the duration of one of the plurality of consecutive time slots.

11. A generator as claimed in claim 10, in which each pre-pulse has a polarity which is opposite that of the succeeding strobe pulse.

12. A generator as claimed in claim 11, in which each of the strobe signals has no net direct current component.

13. A method of addressing a liquid crystal display of the type comprising: a plurality of data electrodes; a plurality of strobe electrodes; and a plurality of liquid crystal pixels formed at intersections between the data electrodes and the strobe electrodes, each liquid crystal pixel having bistable crystal and at least two switching thresholds, the method comprising supplying strobe signals sequentially to the strobe electrodes within a plurality of consecutive time slots, each of the strobe signals comprising a strobe pulse within a corresponding one of the plurality of consecutive time slots, the strobe pulse being preceded by a pre-pulse which reduces patterning caused during a preceding strobe signal, the pre-pulse extending within a time slot preceding the corresponding one of the plurality of consecutive time slots and having a duration greater than the duration of one of the plurality of consecutive time slots.

14. A display as claimed in claim 5, wherein the pre-pulses each comprise at least one sub-pulse.

15. A display as claimed in claim 14, wherein the pre-pulses each comprise a plurality of sub-pulses.

* * * * *